Patented May 29, 1923.

1,457,169

UNITED STATES PATENT OFFICE.

CHARLES C. HOWE, OF WYOMING, RHODE ISLAND, AND STEPHEN W. LIBBY, OF WATERTOWN, MASSACHUSETTS, ASSIGNORS TO WARREN SOAP MANUFACTURING COMPANY, OF BOSTON, MASSACHUSETTS, A CORPORATION OF MASSACHUSETTS.

ANTIRUST COMPOSITION.

No Drawing. Application filed February 2, 1922. Serial No. 533,647.

*To all whom it may concern:*

Be it known that we, CHARLES C. HOWE, of Wyoming, in the county of Washington and State of Rhode Island, and STEPHEN W. LIBBY, of Watertown, in the county of Middlesex and Commonwealth of Massachusetts, citizens of the United States, have invented a new and useful Improvement in Antirust Compositions, of which the following is a specification.

The purpose of our invention is the production of a composition which can be used for coating metal which is liable to rust, for example, polished machinery or parts thereof which are likely to be so exposed to the action of air and moisture as to be corroded thereby.

Our invention consists in a composition of matter which is of such a character that it will not be affected by heat or cold or other atmospheric conditions or when applied to the article to be protected will not be washed off by rain, snow or sleet, nor will it chemically affect the article to which it is applied.

In its preferred form it comprises a combination of petrolatum, wool fat, mineral oil and mica, in substantially the following proportions: petrolatum, 32 parts, wool fat, 32 parts, mineral oil 15 parts, and mica, 18 parts. To this may be added 1 part of cedar oil and 2 parts of graphite.

The purpose of mineral oil is mainly to thin the other fats so that the composition shall be of proper consistency when applied with a brush, and the main purpose of the wool fat and petrolatum is to make the coating cling to the article to be coated, while the mica (which is best sufficiently fine to pass through a 160–200 mesh screen) gives to the composition:—

1. A more compact body so that it may be spread on the article and cover it like paint with an impervious coating.

2. It increases very materially its covering properties.

3. It increases its resistance to the action of the elements, and

4. It preserves its adhesive qualities because it makes the composition stiffer and hence less liable to rub off accidentally.

As the cedar oil has not an unpleasant odor, it is used to disguise the natural odors of the other ingredients, which are unpleasant, especially the wool fat, while the graphite changes the color of the composition.

It is obvious that other proportions than those given may be used, an important feature of the composition being the powdered mica which when properly mixed with the other ingredients will form with them a pastelike coating which will stick to the metal on account of the fatty oils and will not dry out as a paint would, and it may be easily removed by using waste moistened with gasolene or kerosene, although it is not affected by the weather conditions to which the object may be exposed.

Instead of mica any other non-absorbent, chemically inert material may be used, and in place of wool fat and petrolatum may be substituted any other like material which will unite the composition with metal in such a manner that the coating will not be affected by the weather.

To make our new composition, the petrolatum is melted with the oil and wool fat, the whole being thoroughly mixed. The powdered material is then stirred well into the mixture, after which the whole is allowed to cool.

The composition may be applied to the object to be preserved in any convenient way to form a film over it, which will remain as a protection against weather until it is removed.

What we claim as our invention is:—

1. A new composition of matter comprising thinned petrolatum and wool fat and powdered mica in substantially the proportions above named.

2. A new composition of matter, consisting of petrolatum, mineral oil, wool fat and mica in substantially the relative proportions above described.

CHARLES C. HOWE.
STEPHEN W. LIBBY.